(12) United States Patent
Lober et al.

(10) Patent No.: US 9,176,996 B2
(45) Date of Patent: Nov. 3, 2015

(54) AUTOMATED RESOLUTION OF DATABASE DICTIONARY CONFLICTS

(71) Applicants: Andreas Lober, Wiesloch (DE); Markus Schierle, Bad Rappenau (DE)

(72) Inventors: Andreas Lober, Wiesloch (DE); Markus Schierle, Bad Rappenau (DE)

(73) Assignee: SAP SE, Walldorf (DE)

(*) Notice: Subject to any disclaimer, the term of this patent is extended or adjusted under 35 U.S.C. 154(b) by 241 days.

(21) Appl. No.: 13/926,236

(22) Filed: Jun. 25, 2013

(65) Prior Publication Data
US 2014/0379636 A1 Dec. 25, 2014

(51) Int. Cl.
*G06F 17/30* (2006.01)

(52) U.S. Cl.
CPC .... *G06F 17/30292* (2013.01); *G06F 17/30569* (2013.01)

(58) Field of Classification Search
USPC .................................. 707/610, 702, 769, 809
See application file for complete search history.

(56) References Cited

U.S. PATENT DOCUMENTS

| | | | |
|---|---|---|---|
| 5,392,390 A | 2/1995 | Crozier | |
| 5,564,113 A | 10/1996 | Bergen et al. | |
| 6,041,344 A * | 3/2000 | Bodamer et al. | 709/203 |
| 6,236,997 B1 * | 5/2001 | Bodamer et al. | 1/1 |
| 6,631,519 B1 * | 10/2003 | Nicholson et al. | 717/169 |
| 6,694,321 B1 * | 2/2004 | Berno | 1/1 |
| 7,664,795 B2 * | 2/2010 | Balin et al. | 707/661 |
| 7,720,873 B2 | 5/2010 | Loving et al. | |
| 7,840,610 B2 | 11/2010 | Chandrasekharan et al. | |
| 7,974,981 B2 * | 7/2011 | Zhao et al. | 707/769 |
| 8,150,904 B2 | 4/2012 | Queck et al. | |
| 8,275,742 B2 | 9/2012 | Bhatt et al. | |
| 8,311,974 B2 | 11/2012 | Gong | |
| 8,347,207 B2 | 1/2013 | Borgsmidt et al. | |
| 8,386,431 B2 | 2/2013 | Hahn et al. | |
| 2003/0177146 A1 * | 9/2003 | Zimowski | 707/200 |
| 2004/0193567 A1 * | 9/2004 | Dettinger et al. | 707/1 |
| 2005/0131970 A1 * | 6/2005 | Salazar et al. | 707/205 |
| 2005/0251511 A1 * | 11/2005 | Shankar et al. | 707/3 |

(Continued)

OTHER PUBLICATIONS

Jan Schaffner et al.;The multi-tenant data placement problem;2012,accessed on Jul. 17, 2014;6;IARIA,Red Hook,USA;(http://ares.epic.hpi.uni-potsdam.de/apps/static/papers/DBKDA2012-CR.pdf).

(Continued)

*Primary Examiner* — Cam-Linh Nguyen
(74) *Attorney, Agent, or Firm* — Schwegman Lundberg & Woessner, P.A.

(57) ABSTRACT

Copying data in a table from a source database to a target database is performed by copying the table into a conflicts schema. A first INSERT/SELECT statement is executed to copy data from the table. Then, in response to a determination that the table definition for the table in a source database dictionary is not compatible with a table definition for the table in a target database dictionary, the INSERT/SELECT statement execution is rolled back in response to a determination that the data from the first INSERT/SELECT statement did not fit in a table in the target schema of the target database. A second INSERT/SELECT statement is executed including a WHERE clause to copy data from the table to the target schema of the target database. In response to a determination that the second INSERT/SELECT statement did not copy data from the table to the target schema of the target database, a third INSERT/SELECT statement is executed forcing the data to fit.

20 Claims, 11 Drawing Sheets

(56) References Cited

U.S. PATENT DOCUMENTS

| | | |
|---|---|---|
| 2005/0253739 A1 | 11/2005 | Hu et al. |
| 2006/0230067 A1 | 10/2006 | Tarnoff et al. |
| 2008/0126389 A1* | 5/2008 | Mush et al. .................. 707/102 |
| 2009/0287726 A1 | 11/2009 | Verhoeven |
| 2012/0030172 A1 | 2/2012 | Pareek et al. |

OTHER PUBLICATIONS

SAP AG;Business Intelligence Platform Multitenancy Guide;May 14, 2013;122;SAP AG,Walldorf,Germany;(http://help.sap.com/businessobject/product_guides/sbo41/en/sbo41_bip_mtm_en.pdf).

* cited by examiner

AUTOMATED RESOLUTION OF DATABASE DICTIONARY CONFLICTS

TECHNICAL FIELD

This document generally relates to methods and systems for use with computer databases. More specifically, this document relates to the resolution of database dictionary conflicts.

BACKGROUND

A database dictionary is a data structure that stores metadata about the structure and organization of the database. It may, for example, store definitions of all schema objects in the database, space allocation, default values, privileges, etc. A schema is a logical area in the database which contains the table. When database table entries are copied from one database to another database, there may be differences between the database dictionary of the source database and the database dictionary of the target database. For example, a particular table in a schema in a source database may contain data types that are different than the data types for that particular table in a schema of the target database. Such differences may prevent the integration of the particular table entries into the target database. Even small differences can result in a conflict, and copy or move commands may not be able to handle such conflicts.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Figure 1:
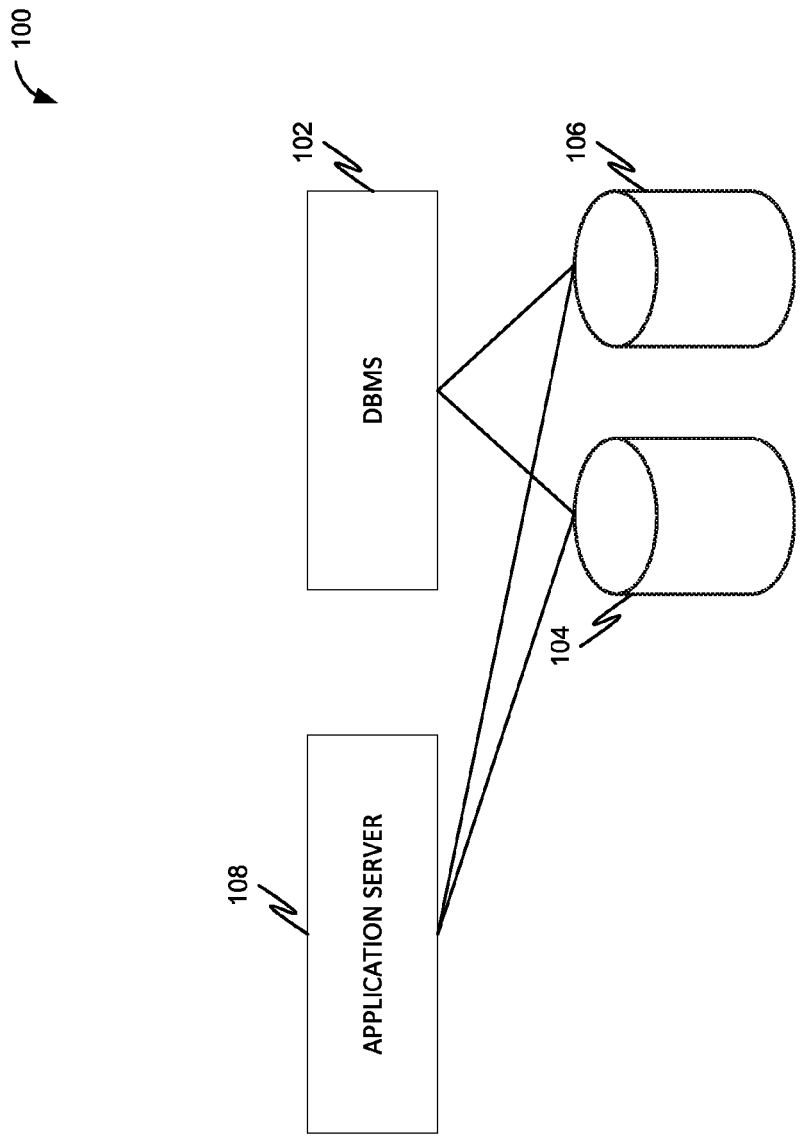
FIG. 1 is a block diagram illustrating a system in accordance with an example embodiment.

In an example embodiment, the movement of data from a table in a source database to a table in a target database is performed using insert commands instead of move or copy commands. This is accomplished by defining a process that mimics move or copy commands using insert commands FIG. 1 is a block diagram illustrating a system in accordance with an example embodiment. The system 100 includes a database management system (DBMS) 102 that manages a first database 104 and a second database 106. In an example embodiment the first database 104 and the second database 106 are relational databases, and the DBMS 102 is a relational database management system (RDBMS).

In an example embodiment, the DBMS 102 copies data from tables in one database to another using INSERT/SELECT statements. In some example embodiments, an optional application server 108 may be used to execute MOVE-CORRESPONDING statements in the event that one or more INSERT/SELECT statements are prevented from executing due to constraints of the first database 104 or the second database 106.

An INSERT/SELECT statement (also known as an INSERT INTO SELECT statement) is a database command that allows for the insertion of multiple columns into a destination table. It allows the DBMS 102 to define a table to which to insert data, and then to identify columns to select from the source table. A typical syntax may be, for example:
INSERT INTO "table1" ("column1", "column2", . . . )
SELECT "column3", "column4", . . .
FROM "table2"

While INSERT/SELECT statements are specifically defined in the Structured Query Language (SQL), this disclosure is not limited to SQL, or even to relational database INSERT/SELECT statements. For purposes of this disclosure, any database command that inserts data from a first table into a second table and provides a mechanism for a selection of which portions of data from the first table to insert, shall be considered an INSERT/SELECT statement, no matter the type of database.

A MOVE-CORRESPONDING command is a command executed by an application server that moves data from one data structure to another data structure. Since it is not run by a DMBS, it is not technically a database command, although it can be performed on data structures in databases. Because it is run outside of the DBMS, it may be slower and utilize more computing resources than an INSERT/SELECT statement.

In an example embodiment, the processes that mimic move or copy commands are implemented in order to copy data within a multitenancy database. In a multitenancy database, a single instance of the database runs on a server, serving multiple clients (tenants). The database is designed to virtually partition the data and configuration of the database for each tenant. In such an embodiment, the first database 104 and the second database 106 may be different partitions of a single multitenancy database.

Figure 2:
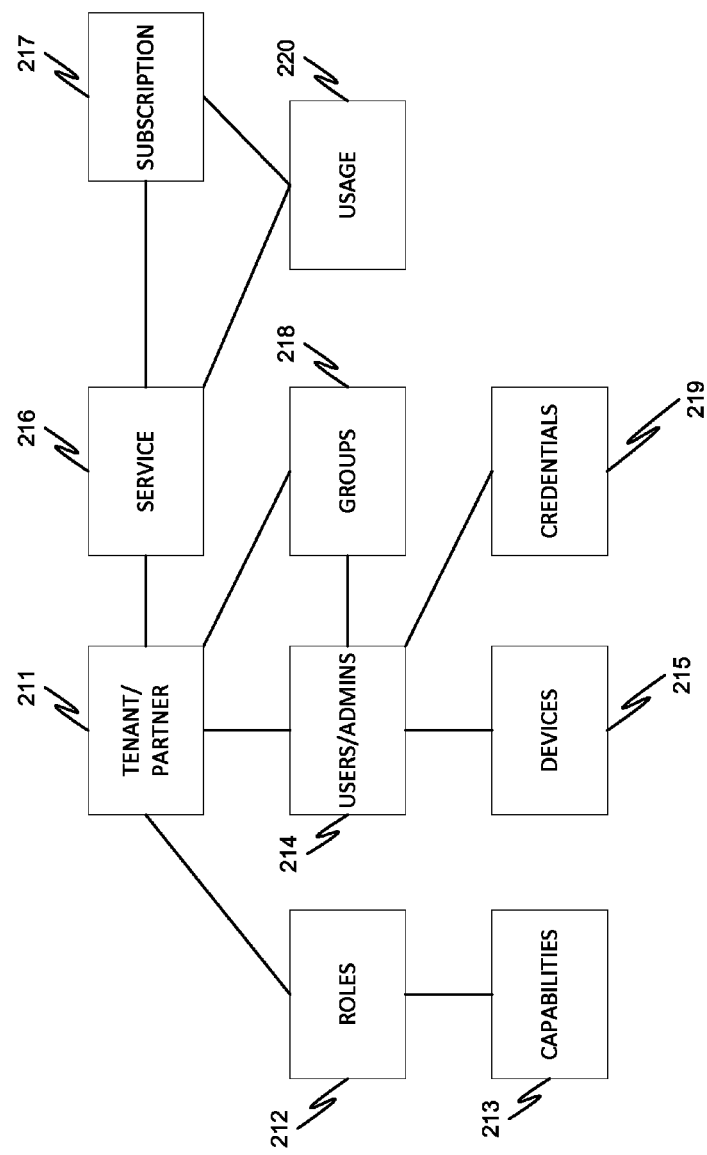
FIG. 2 illustrates an exemplary embodiment of a Tenant Lifecycle Management (TLM) core data model in accordance with an example model.

In another example embodiment, the delivery and monitoring of services for tenants can be accomplished using a Tenant Lifecycle Management (TLM) data model. FIG. 2 illustrates an exemplary embodiment of a TLM core data model in accordance with an example model. For each tenant/partner 211 there may be defined roles 212 and capabilities 213 for each of the roles 212. User/administrators 214 may be associated with various devices 215, credentials 219, groups 218, and services 216. Each service 216 may have one or more subscription attributes 217, and usage 220 may be tracked on a particular service or subscription basis.

Thus, TLM copes with deleting, copying, and moving of tenants (e.g., tenant volumes) within an environment of systems running on multitenancy databases. Copying a tenant means, at least, integrating a copy of an existing tenant volume into the same multitenancy database or into another multitenancy database being operated within the same environment.

Even though all tenant volumes residing on a single system may share the same general database dictionary, there may be differences between the database dictionary of a source and a target database. Copying a tenant volume between databases of different dictionaries may result in conflicts. In current systems, the tables with different definitions are not copied but instead logically moved as tables of their own to a separate schema, referred to as a conflicts schema. In order to conclude the import of the tenant volume, the tables inside the conflict schema are integrated back into the respective target tables. This is traditionally performed within an application server outside of a DBMS. Additionally, this type of remote tenant copy is slow and uses a lot of database resources. All data has to be transferred from the database to an application server and then back to the database. Therefore, database caches, application server caches, and double network traffic is all used.

Figure 3:
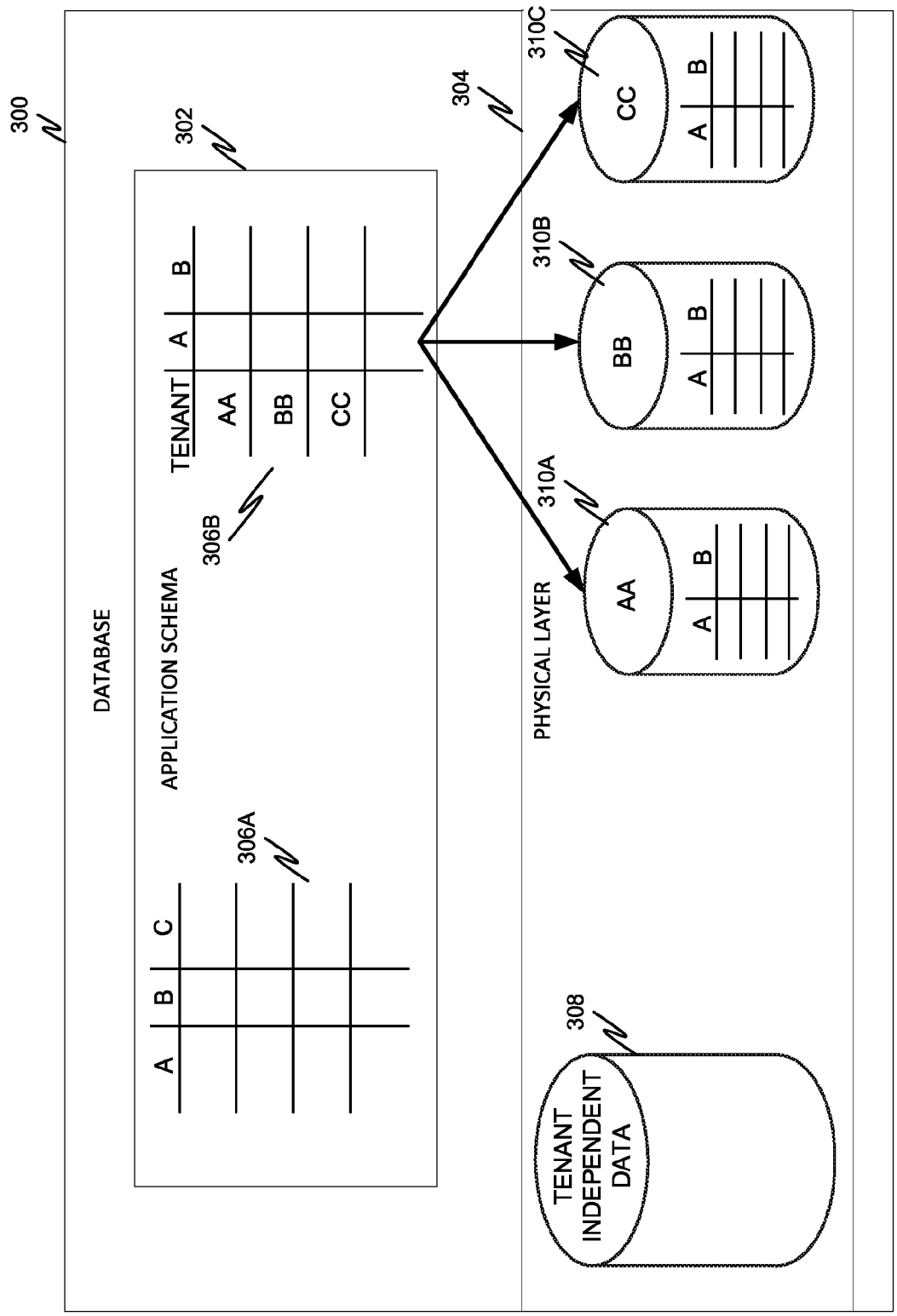
FIG. 3 is a diagram illustrating a multitenant database, in accordance with an example embodiment.

FIG. 3 is a diagram illustrating a multitenant database 300 in accordance with an example embodiment. Database 300 may include an application schema 302, which is a logical layer, and a physical layer 304. The application schema 302 includes various tables 306A, 306B. Here, table 306B is a multitenant table, meaning that the values in table 306B reflect values for different tenants. The physical layer 304 includes tenant independent data 308, as well as partitions 310A, 310B, 310C for each of three different tenants, here identified as tenant AA, tenant BB, and tenant CC.

Figure 4:
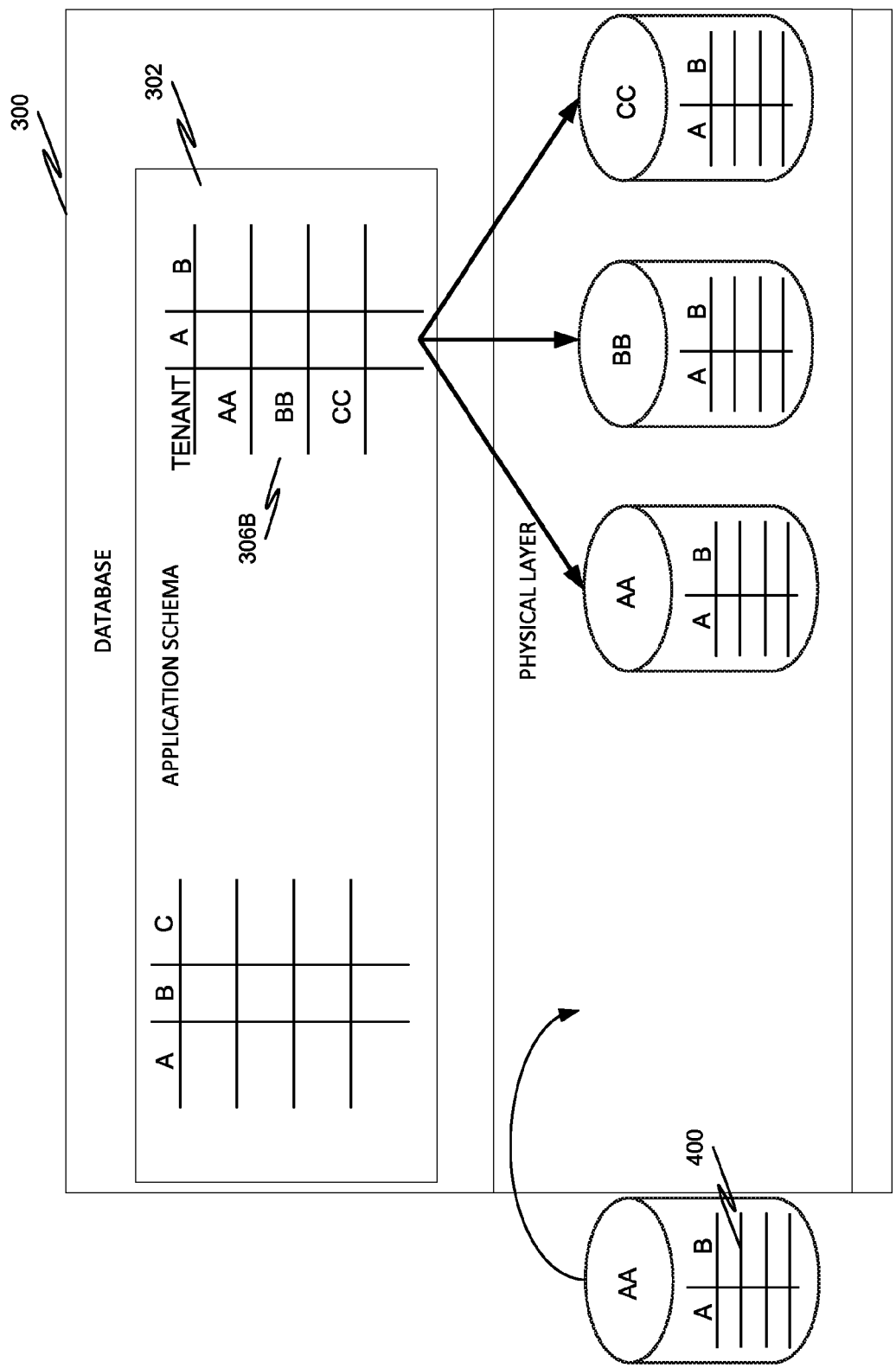
FIG. 4 is a diagram illustrating a multitenant database, in accordance with an example embodiment, as data is imported.

FIG. 4 is a diagram illustrating a multitenant database 300, in accordance with an example embodiment, as data is imported. As can be seen, a table 400 from a different database may be imported into the database 300. As can also be seen, the data in this table 400 contains the same two columns defined in the table 306B in the application schema 302 of database 300. As such, the table 400 may be added as a new table without difficulty.

Figure 5:
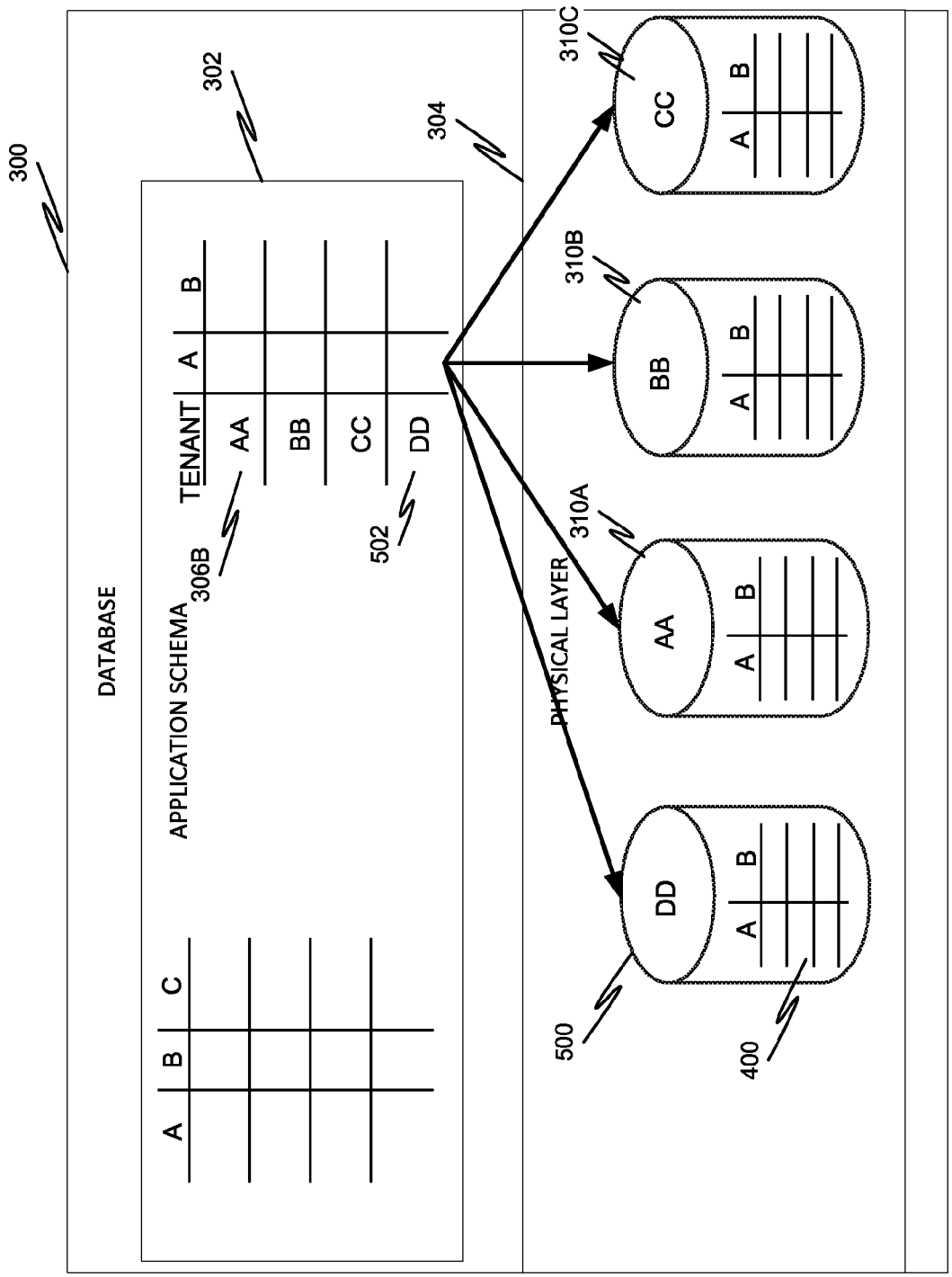
FIG. 5 is a diagram illustrating a multitenant database, in accordance with an example embodiment, after data is imported.

FIG. 5 is a diagram illustrating a multitenant database 300, in accordance with an example embodiment, after data is imported. As can be seen, the table 400 is now contained in a new partition 500 in the physical layer 304, and a new row 502 has been added to table 306B. In this case, the import has caused the creation of the new partition 500, although in some embodiments the new table 400 could be imported into one of the existing partitions 310A, 310B, 310C.

Figure 6:
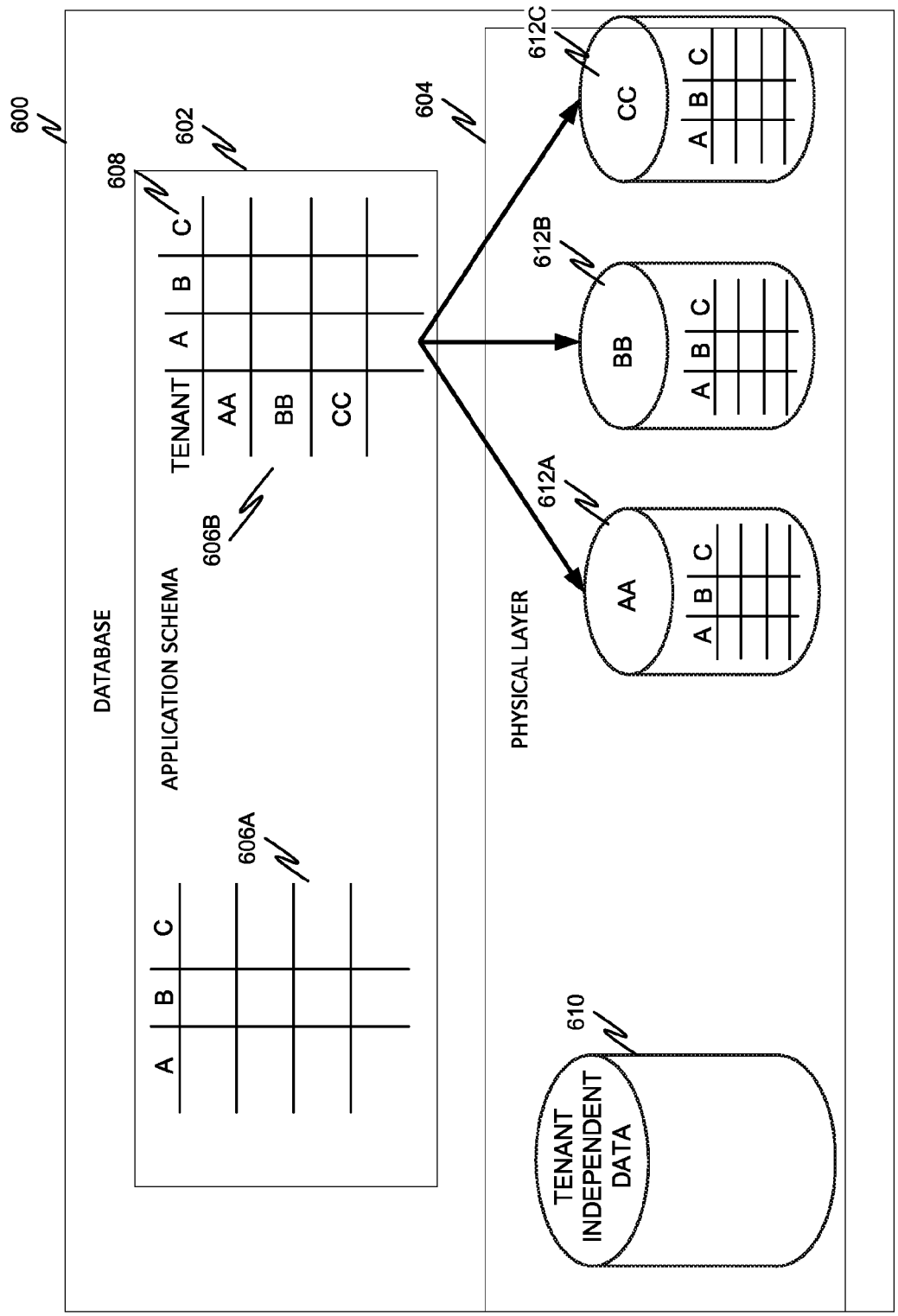
FIG. 6 is a diagram illustrating a multitenant database, in accordance with another example embodiment.

FIG. 6 is a diagram illustrating a multitenant database 600 in accordance with another example embodiment. Again, database 600 may include an application schema 602, which is a logical layer, and a physical layer 604. The application schema 602 includes various tables 606A, 606B. Notably, tables 606A, 606B each have an additional column C 608. The physical layer 604 includes tenant independent data 610, as well as partitions 612A, 612B, 612C for each of three different tenants, here identified as tenant AA, tenant BB, and tenant CC.

Figure 7:
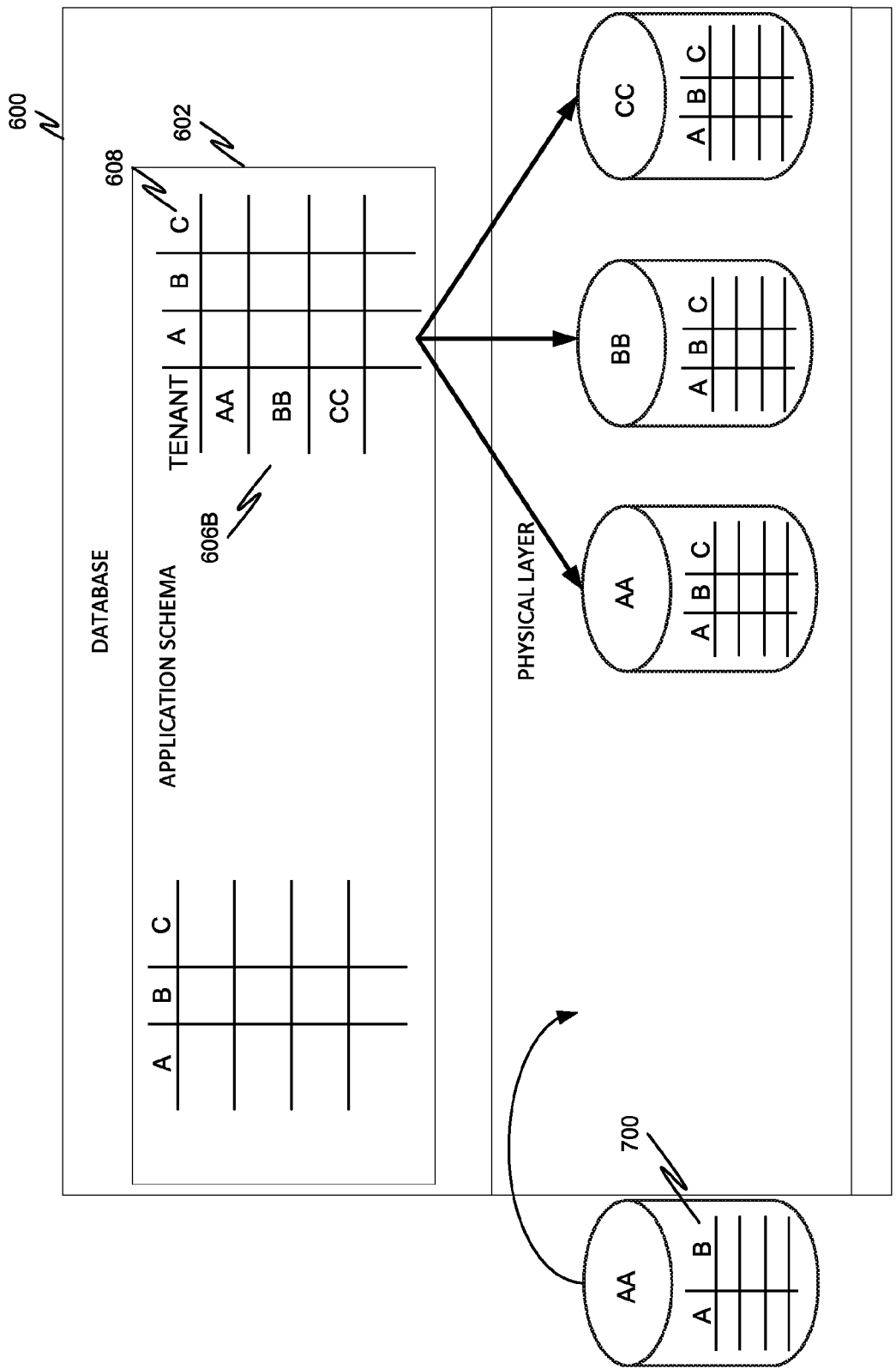
FIG. 7 is a diagram illustrating a multitenant database, in accordance with another example embodiment, as data is imported.

FIG. 7 is a diagram illustrating a multitenant database 600, in accordance with another example embodiment, as data is imported. As can be seen, a table 700 from a different database may be imported into the database 600. As can also be seen, the data in this table 700 contains only two of the columns defined in the table 606B in the application schema 602 of database 600, but not the third column 608. As such, there may be some difficulties in importing the table 700.

It should be note that the additional column may not simply represent a new column, but may also represent additional data.

Figure 8:
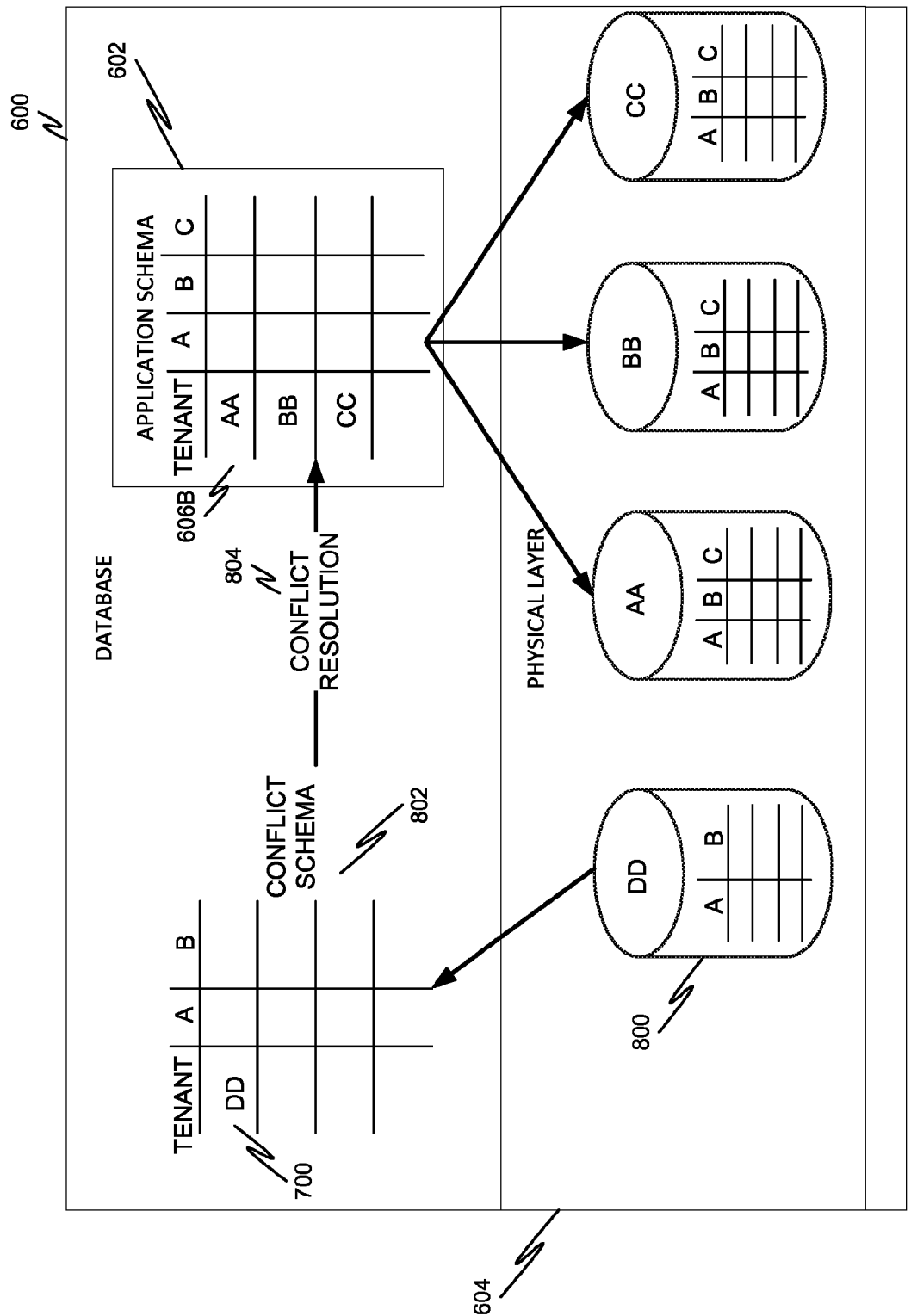
FIG. 8 is a diagram illustrating a multitenant database, in accordance with another example embodiment, after data is imported.

FIG. 8 is a diagram illustrating a multitenant database 600, in accordance with another example embodiment, after data is imported. As can be seen, the table 700 is now contained in a new partition 800 in the physical layer 604. Additionally, the data from table 700 has now been added to a new conflict schema 802 in database 600. Some form of conflict resolution 804 is called for in order to move this data into table 606B. The various forms of conflict resolution 804 will be described in more detail below. In the present example, because the imported table 700 simply contains one less column than the table 606B in the application schema 602, the conflict resolution 804 may be fairly straightforward (e.g., no data is missing). In other situations, such as where the table 606B in the application schema 602 contains fewer columns than the imported table 700, conflict resolution may be more complex (e.g., data may need to be dropped).

Figure 9:
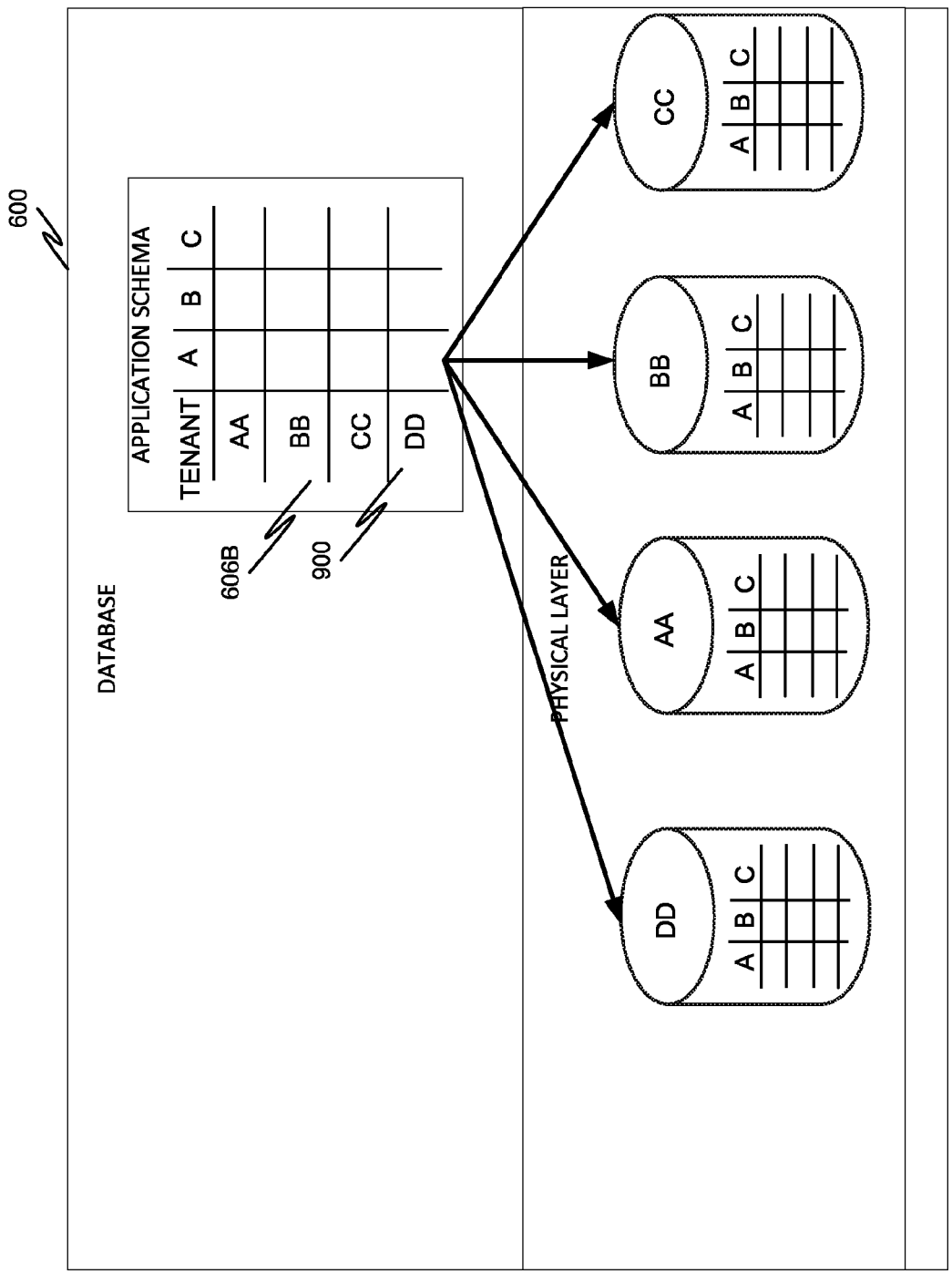
FIG. 9 is a diagram illustrating a multitenant database, in accordance with another example embodiment, after conflict resolution has occurred.

FIG. 9 is a diagram illustrating a multitenant database 600, in accordance with another example embodiment, after conflict resolution has occurred. Here, a new row 900 has been added to table 606B, and the database 600 may operate normally.

In an example embodiment, the following types of conflicts may be automatically resolved:
 (1) Differences in table definitions
  (a) a table is missing on either side (might result in loss of data)
  (b) the column order of a table differs between source and target
  (c) a column is missing on the target side (might result in loss of data if the column contains data on the source side)
  (d) a column is missing on the source side
  (e) a column definition differs
 (2) Differences in index definitions
  (a) an index is missing on either side
  (b) the column order of an index differs between source and target
  (c) a column is missing in the index on either side
  (d) a unique index definition can be different in several ways.

Figure 10:
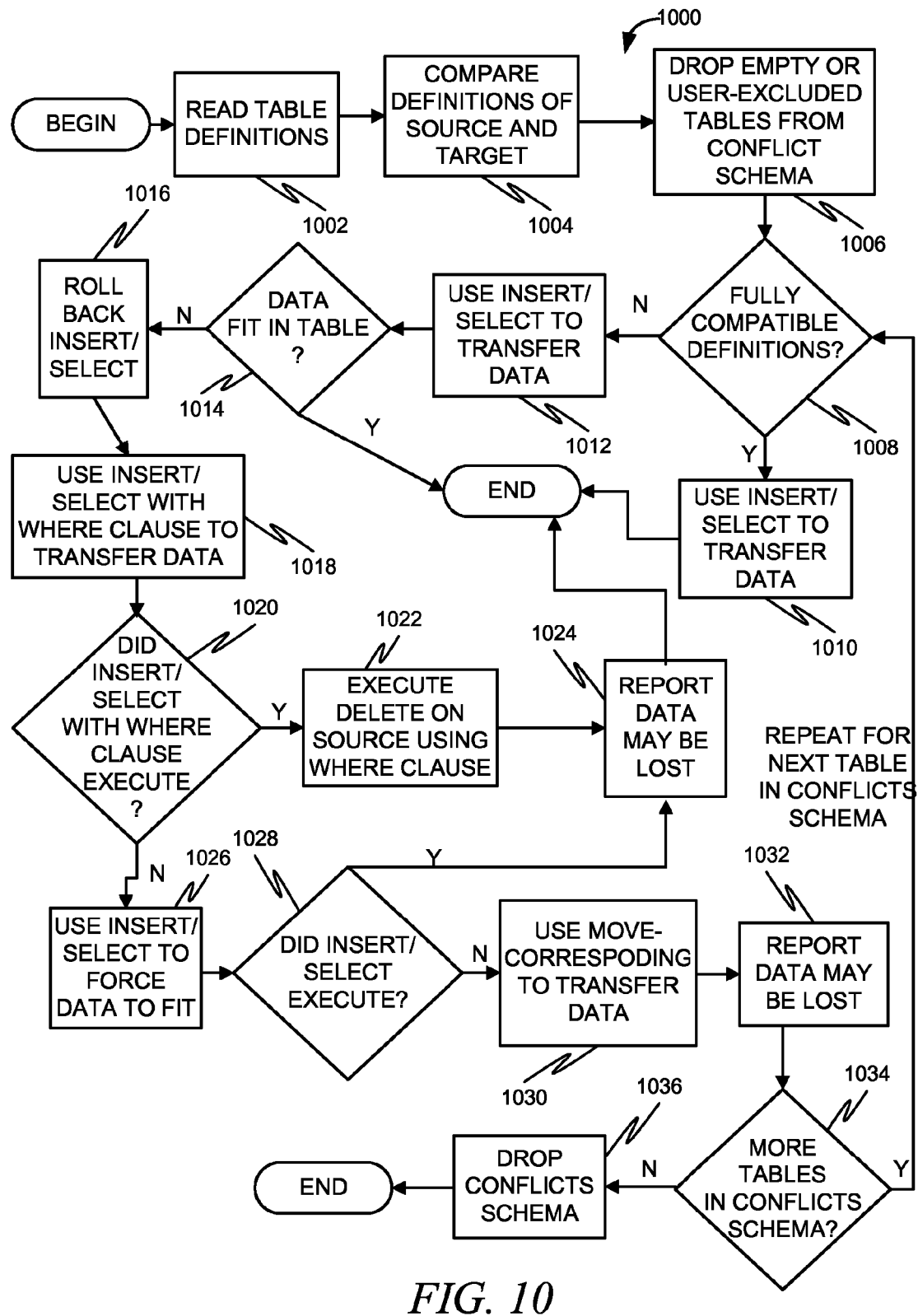
FIG. 10 is a flow diagram illustrating a method, in accordance with an example embodiment, of resolving dictionary conflicts between a source database and a destination database.

FIG. 10 is a flow diagram illustrating a method 1000, in accordance with an example embodiment, of resolving dictionary conflicts between a source database and a destination database. At operation 1002, table definitions are read from a data dictionary for the source database and a data dictionary for the target database. At operation 1004, the definitions from the source database are compared with the definitions from the target database, with any tables containing different definitions being listed in a conflicts schema. At operation 1006, any empty or user-excluded tables are dropped from the conflicts schema. A user-excluded table is one that a user specifically identifies as not requiring conflict resolution.

This may occur, for example, if the conflicting table is not important to the user, or if he or she is confident that the possible data loss is acceptable.

The tables themselves may be copied into the conflicts schema. Operations 1008-1016 are iterated for each table in the conflicts schema. At operation 1008, it is determined if the table has definitions that are fully compatible between the source and the target dictionary. This may be determined with reference to the conflicts schema—if the table is not contained in the conflicts schema then it may be assumed that the definitions are identical between the source and target dictionary. If so, then at operation 1010 an INSERT/SELECT statement is used to transfer data from columns of the table to the target schema of the target database. Thus, all compatible columns are transferred. If the table has definitions that are not identical between the source and target dictionary, then at operation 1008 the process moves to operation 1012. At operation 1012, an INSERT/SELECT statement is used to transfer data from columns of the table to the target database. Basically, at operation 1012, the data is assumed to be compatible and simply transferred. Then, at operation 1014, it is determined if the data from the columns in the table in the conflict schema fits in the table of the target schema of the target database. If not, then at operation 1016 the database rolls back the execution of operation 1012 so that no data is lost. Thus, any data from tables with definitions that are not identical, but that winds up being able to be copied over without loss of data anyway, is copied. If it is determined at operation 1014 that the data from the columns in the table in the conflict schema fits in the table of the target schema of the target database, then the method ends.

Proceeding from operation 1016, at operation 1018, an INSERT/SELECT statement using a WHERE clause is used to transfer data from columns of the table of the conflicts schema to the target schema of the target database. The WHERE clause contains a condition on which the INSERT/SELECT statement runs. If the WHERE clause is not met, then the INSERT/SELECT statement is not executed in operation 1018. At operation 1020, it is determined if the INSERT/SELECT statement with the WHERE clause executed. If so, then at operation 1022, a DELETE statement is executed on the table in the conflict schema, using the same WHERE clause. Thus, any data copied in operation 1018 will be deleted from the conflict schema in operation 1022. Then, at operation 1024, it may be reported that data will be lost upon continuing.

If the INSERT/SELECT statement with the WHERE clause did not execute, then at operation 1026, an INSERT/SELECT statement is used to force data to fit from columns of the table of the conflict schema to the target schema of the target database while forcing the data to fit. This may include simply not copying over any data from the columns that does not fit. For example, a column in the table may be a character string of length 5 in the conflict schema while the same table definition for the column has a length of 4 in the target schema of the target database. In such a case, the INSERT/SELECT statement may be used to transfer a character string of length 4 from the table in the conflict schema, effectively dropping the remainder. At operation 1024, an indication that data may have been lost may be reported. Basically, the data loss is simply accepted and reported.

While it would appear that operation 1026 would simply take care of all remaining tables in the conflicts schema, there may be some instances where the INSERT/SELECT statement is barred from transferring data from columns of the table of the conflict schema to the target schema of the target database, such as where the database itself has a constraint against doing so. In an illustrative example, the MaxDB relational database management system (RDBMS) forbids the copying of data from a column defined as a character string to a column defined as "long" (e.g., an integer of length 64). In such instances, there may be some remaining tables in the conflict schema. As such, at operation 1028, it is determined if the INSERT/SELECT statement executed. If so, then at operation 1030, any such remaining data is copied using a MOVE-CORRESPONDING statement. At operation 1032, an indication that data may have been lost may be reported.

At operation 1034, it may be determined whether there are any remaining tables in the conflicts schema. If so, then the process may iterate back up to operation 1008. If not, then at operation 1036, the conflicts schema is dropped. Any table still located in it will still be lost.

In the above description, the INSERT/SELECT commands may be created dynamically using, for example, native SQL and SQL functions for data conversion if needed.

In some example embodiments, a conflicts schema is used in the target database to represent the source database's dictionary. In such cases, modifications made to the "source database" are actually made to the conflicts schema in the target database. Other embodiments are foreseeable that might use renamed tables already in the target database/schema as a source for the described re-integration.

It should also be noted that embodiments are foreseen where the copied data is not deleted from the conflict schema. While deletion of the data from the conflict schema may be useful in certain cases, such as tenant lifecycle management, there may be instances where it is useful not to delete such data, and this disclosure encompasses all of these possibilities.

In an example embodiment, full compatibility of tables means that the source data fits completely into the target. The following are examples of instances where full compatibility may occur:

Source VARCHAR(n) is compatible with target VARCHAR(m) for all n ≤m.
Source VARCHAR(n) is compatible with target CLOB/STRING for all n.
Source NUMC(n) is compatible with target NUMC(m) for all n≤m.
Source NUMC(n) is compatible with target NUMBER for all n.

As for limited compatibility, here the definitions are not completely compatible. However, the data contained in the source may fit into the column definition. The following are examples of instances where limited compatibility may occur:

Source CHAR(n) is compatible with target CHAR(m), n>m, if data in source has maximum length ≤m.
Source CLOB/STRING is compatible with target CHAR (m) if data in source has maximum length ≤m, it will be transformed via SQL functions.
Source NUMC(5) is compatible with target NUMC(4) if data in source is always of the format 0nnnn.

In an example embodiment, SQL statements are dynamically generated. They can be generated by comparing the source and the target table definition within the ABAP using the ADBC classes. In cases where there is full compatibility without data conversion, this may be performed using the following example SQL statements:

```
INSERT INTO <target table>
    (column 1
    ,column 2
    ,...
    ,column n
    )
SELECT column 1
    ,column 2
    ,...
    ,column n
FROM <source table>
```

For full compatibility with data conversion, such as, for example, converting NUMC(n), wherein NUMC(n) is a character data type containing only integers with leading 0's to fill up until the length n is reached, the conversion may occur using the following example SQL statements:

```
INSERT INTO <target table>
    (...
    ,data
    ,...)
SELECT...
    ,TO_NUMBER(data)
    ,...
FROM <source table>
```

For limited compatibility, such as, for example, converting LONG/CLOB/STRING into VARCHAR (where such data types wouldn't ordinarily fit, but perhaps the data contained in them would), conversion may occur using the following example SQL function:

```
CASE WHEN LENGTH(data) > 100 THEN SUBSTR(data, 1, 101)
    ELSE SUBSTR(data, 1, 100)
END
```

This way all data will fit into the target as long it is not longer than 100 characters. As soon as one row violates this rule, a SQL error is thrown and the complete INSERT is rejected:

```
INSERT INTO <target table>
    (...
    ,data
    ,...
    )
SELECT...
    ,CASE WHEN LENGTH(data) > 100 THEN SUBSTR(data, 1, 101)
        ELSE                          SUBSTR(data, 1, 100)
        END
    ,...
FROM <source table>
```

When a WHERE clause is used, the case above will then look like:

```
INSERT INTO <target table>
    (...
    ,data
    ,...
    )
SELECT...
    ,SUBSTR(data, 1, 100)
    ,...
FROM <source table>
WHERE...
    AND LENGTH(data) <= 100
    AND...
```

These rows then will be deleted from the source table directly afterwards:

```
DELETE
FROM <source table>
WHERE...
    AND LENGTH(data) <= 100
    AND...
```

When no WHERE clause is used and data loss is simply accepted, trailing information is cut off to make data fit, for example, as follows:

```
INSERT INTO <target table>
    (...
    ,data
    ,...)
SELECT...
    ,SUBSTR(data, 1, 100)
    ,...
FROM <source table>
```

In another example, for converting NUMC(n) to NUMC(m), where n<m, the following example SQL statements may be used:

```
INSERT INTO <target table>
    (...
    ,data
    ,...
    )
SELECT...
    ,LPAD(data, m, '0')
    ,...
FROM <source table>
```

In another example, for converting NUMC(n) to NUMC(m), where n>m (example n=5, m=4), the following example SQL statements may be used:

```
CASE WHEN TO_NUMBER(data) > 9999 THEN '#####'
    ELSE              SUBSTR(data, 2)
END
```

This way all data will fit into the target as long it is not larger than 9999. Simply the leading 0's that are too much are cut off: 1+(5−4)=2 as starting position for the new numerical string. As soon as one row violates this rule, a SQL error is thrown and the complete INSERT is rejected:

```
INSERT INTO <target table>
    (...
    ,data
    ,...
    )
SELECT...
    , CASE WHEN TO_NUMBER(data) > 9999 THEN '#####'
        ELSE                        SUBSTR(data, 2)
        END
    ,...
FROM <source table>
```

Figure 11:
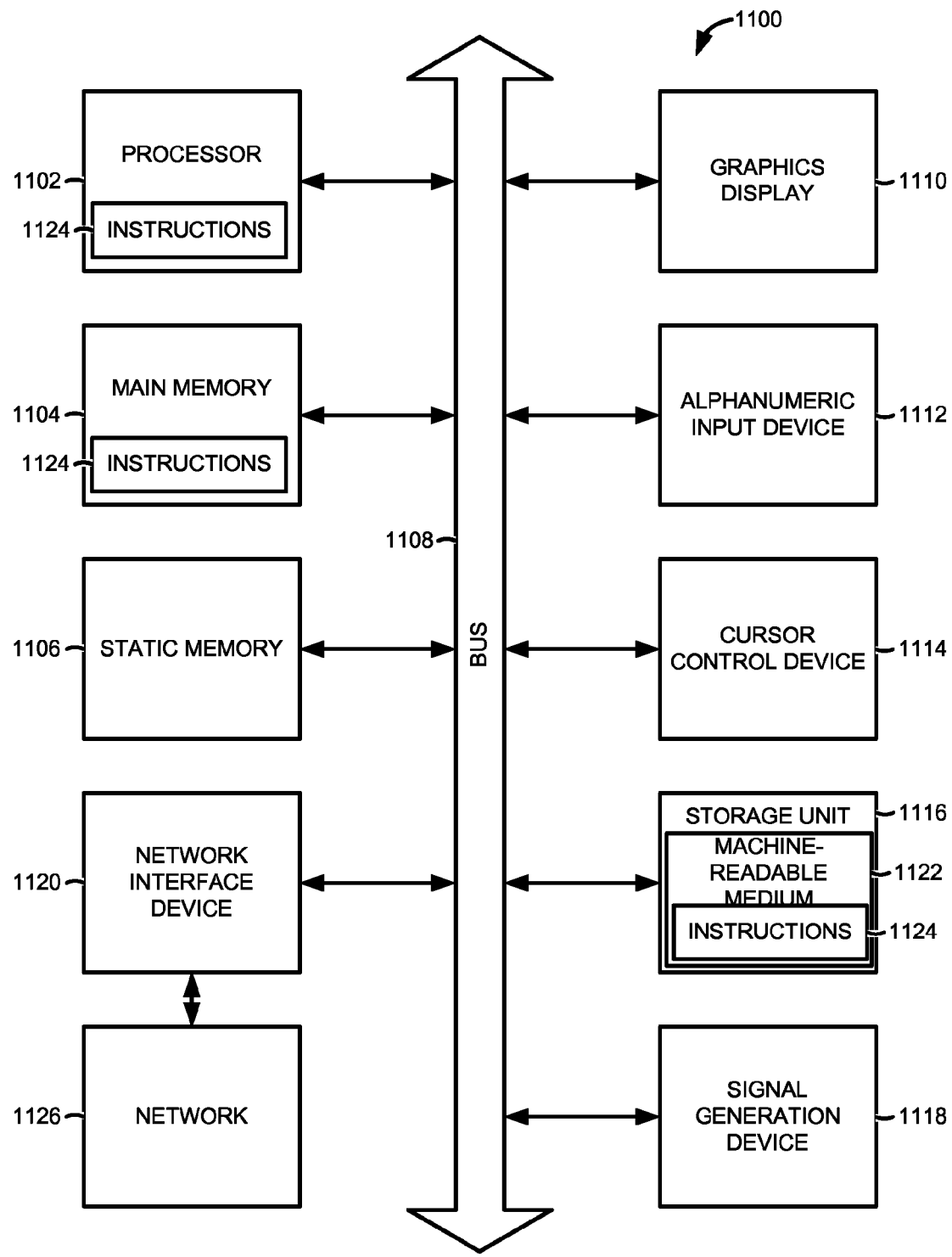
FIG. 11 is a block diagram of a computer processing system at a server system, within which a set of instructions may be executed for causing the computer to perform any one or more of the methodologies discussed herein.

FIG. 11 is a block diagram of a computer processing system 1100 at a server system, within which a set of instructions 1124 may be executed for causing the computer to perform any one or more of the methodologies discussed herein.

Embodiments may also, for example, be deployed by Software-as-a-Service (SaaS), application service provider (ASP), or utility computing providers, in addition to being sold or licensed via traditional channels. The computer may be a server computer, a personal computer (PC), a tablet PC, a set-top box (STB), a personal digital assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 1100 includes processor 1102 (e.g., a central processing unit (CPU), a graphics processing unit (GPU) or both), main memory 1104 and static memory 1106, which communicate with each other via bus 1108. The processing system 1100 may further include graphics display unit 1110 (e.g., a plasma display, a liquid crystal display (LCD) or a cathode ray tube (CRT)). The processing system 1100 also includes alphanumeric input device 1112 (e.g., a keyboard), a cursor control device 1114 (e.g., a mouse, touch screen, or the like), a storage unit 1116, a signal generation device 1118 (e.g., a speaker), and a network interface device 1120.

The storage unit 1116 includes machine-readable medium 1122 on which is stored one or more sets of instructions 1124 and data structures (e.g., software) embodying or utilized by any one or more of the methodologies or functions described herein. The instructions 1124 may also reside, completely or at least partially, within the main memory 1104 and/or within the processor 1102 during execution thereof by the processing system 1100, the main memory 1104 and the processor 1102 also constituting machine-readable, tangible media.

The instructions 1124 may further be transmitted or received over network 1126 via a network interface device 1120 utilizing any one of a number of well-known transfer protocols (e.g., HTTP).

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions 1124. The term "machine-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, and optical and magnetic media.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method of copying data in a table from a source database to a target database, the method comprising:
    copying, by one or more processors, data from the table in the source database into a conflicts schema;
    determining, by the one or more processors, whether a table definition for the table in the source database dictionary is compatible with a table definition for the table in a target database dictionary;
    executing, by the one or more processors a first INSERT/SELECT statement to copy data from the table in the conflicts schema to a target schema of the target database;
    in response to a determination that the table definition for the table in the source database dictionary is not compatible with the table definition for the table in the target database dictionary:
        rolling back the first INSERT/SELECT statement execution in response to a determination that the data from the first INSERT/SELECT statement did not fit in the table in the target schema of the target database;
        executing a second INSERT/SELECT statement including a WHERE clause to copy data from the table in the conflicts schema to the target schema of the target database;
        in response to a determination that the second INSERT/SELECT statement did not copy data from the table in the conflicts schema to the target database, executing a third INSERT/SELECT statement forcing the data to fit in the table in the target schema of target database.

2. The method of claim 1, wherein the determining whether the table definition for the table in the source database dictionary is compatible with the table definition for the table in the target database dictionary includes determining whether the table is in the conflicts schema.

3. The method of claim 1, further comprising, upon completion of execution of the second INSERT/SELECT statement, deleting all copied rows from the table from the conflicts schema.

4. The method of claim 3, wherein the deleting all copied rows includes using the WHERE clause in a DELETE statement.

5. The method of claim 1, further comprising, upon completion of execution of the third INSERT/SELECT statement, reporting an indication that data may have been lost.

6. The method of claim 2, further comprising repeating the executing of the first INSERT/SELECT statement, rolling back, executing the second INSERT/SELECT statement, and executing the third INSERT/SELECT statement for each table in the conflicts schema.

7. The method of claim 6, after the executing of the first INSERT/SELECT statement, the rolling back, the executing of the second INSERT/SELECT statement, and the executing of the third INSERT/SELECT statement for each table in the conflicts schema for each table in the conflicts schema, dropping the conflicts schema.

8. The method of claim 1, further comprising, in response to a determination that the third INSERT/SELECT statement cannot be executed due to constraints of the target database, executing a MOVE-CORRESPONDING statement forcing the data to fit in the table in the target database.

9. The method of claim 1, wherein the source database and the target database are both located in at least one multitenancy database.

10. The method of claim 1, wherein the source database and the target database are different partitions of a single multitenancy database.

11. A system comprising:
a source database in a memory;
a target database;
a database management system executable by one or more processors configured to:
copy data from the table in the source database into a conflicts schema;
determine whether a table definition for the table in the source database dictionary is compatible with a table definition for the table in a target database dictionary;
execute a first INSERT/SELECT statement to copy data from the table in the conflicts schema to a target schema of the target database;
in response to a determination that the table definition for the table in the source database dictionary is not compatible with the table definition for the table in the target database dictionary:
roll back the first INSERT/SELECT statement execution in response to a determination that the data from the first INSERT/SELECT statement did not fit in the table in the target schema of the target database;
execute a second INSERT/SELECT statement including a WHERE clause to copy data from the table in the conflicts schema to the target schema of the target database;
in response to a determination that the second INSERT/SELECT statement did not copy data from the table in the conflicts schema to the target database, execute a third INSERT/SELECT statement forcing the data to fit in the table in the target schema of target database.

12. The system of claim 11, further comprising an application server configured to:
in response to a determination that the third INSERT/SELECT statement cannot be executed due to constraints of the target database, execute a MOVE-CORRESPONDING statement forcing the data to fit in the table in the target database.

13. The system of claim 11, wherein the source database and the target database are both located in at least one multitenancy database.

14. The system of claim 11, wherein the source database and the target database are different partitions of a single multitenancy database.

15. A non-transitory computer-readable storage medium comprising instructions that, when executed by at least one processor of a machine, cause the machine to perform operations of copying data in a table from a source database to a target database, the operations comprising:
copying data from the table in the source database into a conflicts schema;
determining whether a table definition for the table in the source database dictionary is compatible with a table definition for the table in a target database dictionary;
executing a first INSERT/SELECT statement to copy data from the table in the conflicts schema to a target schema of the target database;
in response to a determination that the table definition for the table in the source database dictionary is not compatible with the table definition for the table in the target database dictionary:
rolling back the first INSERT/SELECT statement execution in response to a determination that the data from the first INSERT/SELECT statement did not fit in the table in the target schema of the target database;
executing a second INSERT/SELECT statement including a WHERE clause to copy data from the table in the conflicts schema to the target schema of the target database;
in response to a determination that the second INSERT/SELECT statement did not copy data from the table in the conflicts schema to the target database, executing a third INSERT/SELECT statement forcing the data to fit in the table in the target schema of target database.

16. The non-transitory computer-readable storage medium of claim 15, wherein the determining whether the table definition for the table in the source database dictionary is compatible with the table definition for the table in the target database dictionary includes determining whether the table is in the conflicts schema.

17. The non-transitory computer-readable storage medium of claim 15, further comprising, upon completion of execution of the second INSERT/SELECT statement deleting all copied rows from the table from the conflicts schema.

18. The non-transitory computer-readable storage medium of claim 17, wherein the deleting all copied rows includes using a WHERE clause in a DELETE statement.

19. The non-transitory computer-readable storage medium of claim 15, further comprising, upon completion of execution of the third INSERT/SELECT statement, reporting an indication that data may have been lost.

20. The non-transitory computer-readable storage medium of claim 16, further comprising repeating the executing of the first INSERT/SELECT statement, rolling back, executing the second INSERT/SELECT statement, and executing the third INSERT/SELECT statement for each table in the conflicts schema.

* * * * *